United States Patent
Williams

(10) Patent No.: US 11,163,830 B2
(45) Date of Patent: Nov. 2, 2021

(54) AUGMENTING THE DISPLAY OF DATA IN A TREE FORMAT

(71) Applicant: International Business Machines Corporation, Armonk, NY (US)

(72) Inventor: Anthony C. Williams, Redwood City, CA (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 14/691,700

(22) Filed: Apr. 21, 2015

(65) Prior Publication Data

US 2016/0314152 A1    Oct. 27, 2016

(51) Int. Cl.
G06F 17/30 (2006.01)
G06F 16/901 (2019.01)
G06F 16/44 (2019.01)
G06F 16/22 (2019.01)
G06F 16/2455 (2019.01)

(52) U.S. Cl.
CPC ...... G06F 16/9027 (2019.01); G06F 16/2246 (2019.01); G06F 16/24564 (2019.01); G06F 16/44 (2019.01)

(58) Field of Classification Search
CPC ......... G06F 17/30961; G06F 17/30327; G06F 17/30507; G06F 16/9027; G06F 16/2246; G06F 16/44; G06F 16/24564
USPC ........................................................ 707/694
See application file for complete search history.

(56) References Cited

U.S. PATENT DOCUMENTS

| | | | |
|---|---|---|---|
| 5,895,474 A | 4/1999 | Maarek et al. | |
| 6,055,515 A | 4/2000 | Consentino et al. | |
| 6,341,280 B1 * | 1/2002 | Glass | G06F 16/10 707/754 |
| 7,062,493 B1 | 6/2006 | Babka et al. | |
| 7,472,356 B2 * | 12/2008 | Vronay | G06F 3/0485 715/828 |
| 8,260,784 B2 | 9/2012 | Beyer et al. | |
| 9,396,249 B1 * | 7/2016 | Balasubramanian | G06F 16/9027 |
| 9,978,162 B1 * | 5/2018 | Brett | G06F 16/26 |

(Continued)

OTHER PUBLICATIONS

Jones, et al., "WebFinger (RFC7033)", An IP.com Prior Art Database Technical Disclosure, Publication Date Sep. 1, 2013; IP.com No. 000231128, 30 pages.

(Continued)

*Primary Examiner* — Huawen A Peng
(74) *Attorney, Agent, or Firm* — Marcus D. Walker

(57) ABSTRACT

The method includes identifying a tree data structure. The method includes identifying one or more features in the identified tree data structure, wherein the one or more features comprise at least one of: a node of the tree data structure, an object of the tree data structure, an array of the tree data structure, an object property of the tree data structure, and a root of the tree data structure. The method includes determining whether one of the one or more identified features matches a feature that initiates execution of a rule, wherein the rule defines augmentations to the tree data structure based upon one or more features in the tree data structure. The method includes augmenting the identified tree data structure based upon the determined one or more matches of the one or more identified features and the feature that initiates execution of the rule.

19 Claims, 4 Drawing Sheets

(56) References Cited

U.S. PATENT DOCUMENTS

| | | | |
|---|---|---|---|
| 2003/0218641 A1* | 11/2003 | Longobardi | G06F 16/10 715/853 |
| 2004/0090472 A1 | 5/2004 | Risch et al. | |
| 2006/0129569 A1* | 6/2006 | Dieberger | G06F 3/0482 |
| 2008/0052298 A1* | 2/2008 | Yeh | G06F 16/9027 |
| 2009/0070359 A1* | 3/2009 | Nolan | G06F 16/283 |
| 2010/0067113 A1 | 3/2010 | Harrison | |
| 2010/0262900 A1 | 10/2010 | Romatier et al. | |
| 2012/0256917 A1 | 10/2012 | Lieberman et al. | |
| 2013/0151565 A1* | 6/2013 | Vion-Dury | G06F 16/9027 707/797 |
| 2014/0207826 A1 | 7/2014 | Gao et al. | |
| 2014/0245196 A1* | 8/2014 | Zheng | G06F 8/38 715/762 |
| 2014/0282854 A1* | 9/2014 | Clark | H04L 63/0263 726/1 |
| 2014/0365527 A1 | 12/2014 | Fuchs et al. | |
| 2014/0365529 A1* | 12/2014 | Aila | G06F 16/9027 707/797 |

OTHER PUBLICATIONS

Schlegel, et al., "Balloon Synopsis: A Modern Node-Centric RDF Viewer and Browser for the Web", University of Passau, Germany, 2014, 4 pages.

"Methods for handling structure data on spreadsheet", An IP.com Prior Art Database Technical Disclosure, Publication Date Apr. 28, 2010; IP.com No. 000195296, 6 pages.

"[WebSphere Patent Program] A means and system of cloud integration for mobile access", An IP.com Prior Art Database Technical Disclosure, Publication Date Nov. 15, 2013; IP.com No. 000232539, 11 pages.

Appendix P, List of IBM Patents or Patent Applications Treated as Related, 2 pages, dated Feb. 2, 2016.

Williams, Anthony, C., "Augmenting the Display of Data in a Tree Format", U.S. Appl. No. 15/011,712, filed Feb. 1, 2016, 23 pages.

* cited by examiner

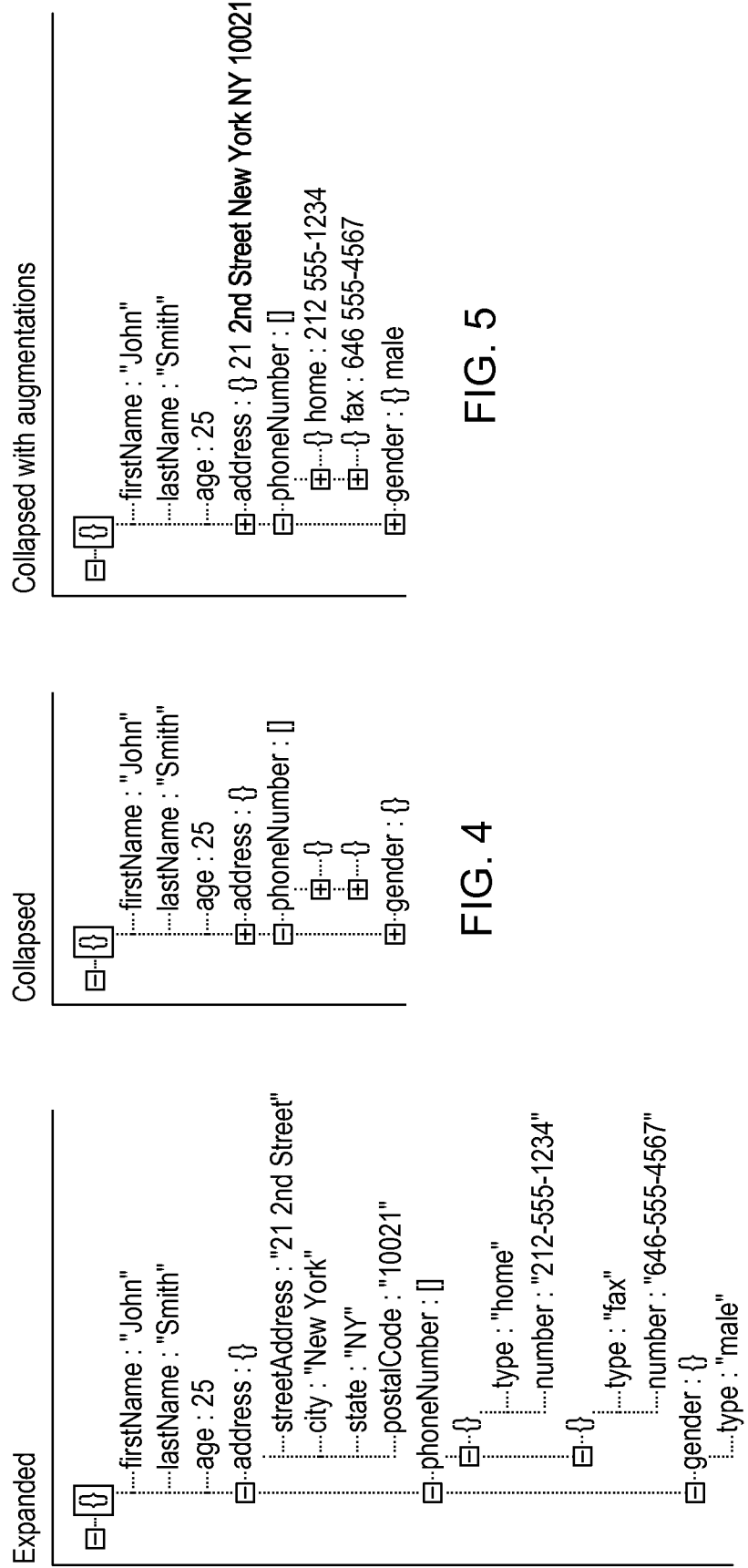

AUGMENTING THE DISPLAY OF DATA IN A TREE FORMAT

BACKGROUND

The present invention relates generally to data trees, and more particularly to augmenting data in tree formats.

In computer science, a data tree is a widely used abstract data type (ADT) or data structure implementing this ADT that simulates a hierarchical tree structure, with a root value and subtrees of children, represented as a set of linked nodes.

A tree data structure can be defined recursively (locally) as a collection of nodes (starting at a root node), where each node is a data structure consisting of a value, together with a list of references to nodes (the "children"), with the constraints that no reference is duplicated, and none points to the root.

Alternatively, a data tree can be defined abstractly as a whole (globally) as an ordered tree with a value assigned to each node. Both the recursive and whole data tree perspectives are useful because a tree can be analyzed mathematically as a whole, when actually represented as a data structure tree, and worked separately by node (rather than as a list of nodes and an adjacency list of edges between nodes, as one may represent a digraph, for instance). For example, looking at a tree as a whole, one can talk about "the parent node" of a given node, but in general as a data structure a given node only contains the list of the node's children but does not contain a reference to the node's parent (if any).

SUMMARY

Embodiments of the present invention disclose a method, computer program product, and system for augmenting data tree structures. In one embodiment, in accordance with the present invention, the computer-implemented method includes identifying, by one or more computer processors, a tree data structure. The method further includes identifying, by one or more computer processors, one or more features in the identified tree data structure, wherein the one or more features comprise at least one of: a node of the tree data structure, an object of the tree data structure, an array of the tree data structure, an object property of the tree data structure, and a root of the tree data structure. The method further includes determining, by one or more computer processors, whether one of the one or more identified features matches a feature that initiates execution of a rule, wherein the rule defines augmentations to the tree data structure based upon one or more features in the tree data structure. The method further includes in response to determining that one or more identified features match at feature that initiates execution of a rule, augmenting, by one or more computer processors, the identified tree data structure based upon the determined one or more matches of the one or more identified features and the feature that initiates execution of the rule.

BRIEF DESCRIPTION OF THE DRAWINGS

FIG. 3 depicts an expanded tree data structure without augmenting the tree data structure, in accordance with an embodiment of the present invention;

FIG. 4 depicts a collapsed tree data structure without augmenting the tree data structure, in accordance with an embodiment of the present invention;

FIG. 5 depicts a collapsed tree data structure that has been augmented to display certain features while in a collapsed state, in accordance with an embodiment of the present invention.

DETAILED DESCRIPTION

Embodiments of the present invention recognize that a tree data structure is not designed for easy human consumption on the face of the tree data structure. Embodiments recognize that searching for information stored in nodes can be time consuming, as expanding nodes in a tree data structure can lead to many fruitless expansions and contractions. Embodiments of the present invention also recognize that users may have preferences when viewing tree data structures from a similar source.

Figure 1:
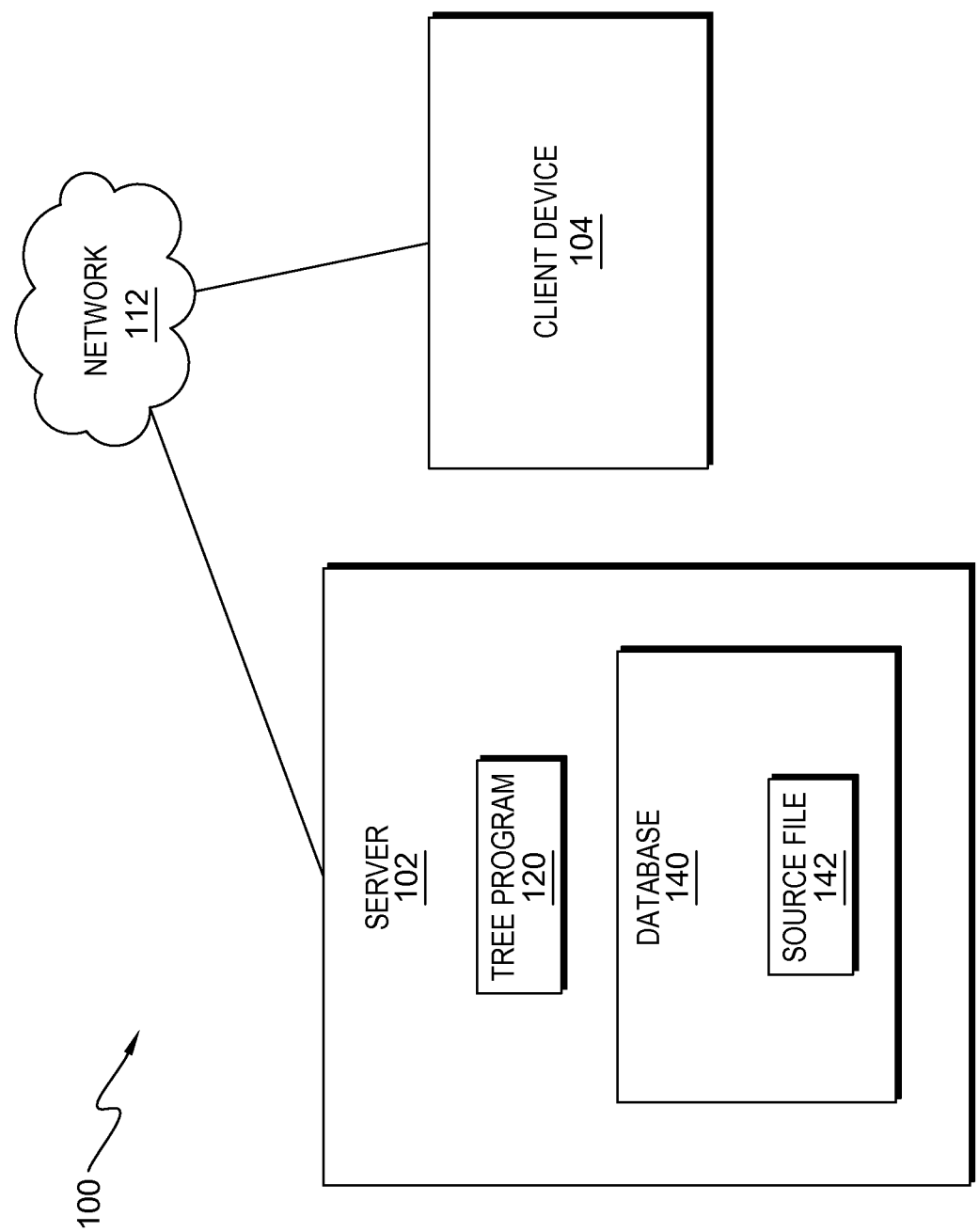
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 102 and client device 104, interconnected over network 112. Network 112 represents, for example, a telecommunications network, a local area network (LAN), a wide area network (WAN), such as the Internet, or a combination of the three, and includes wired, wireless, and/or fiber optic connections. Network 112 includes one or more wired and/or wireless networks that are capable of receiving and transmitting data, voice, and/or video signals, including multimedia signals that include voice, data, and video information.

In the depicted environment, server 102 is one or more of a management server, a web server, or any other electronic device or computing system capable of receiving, analyzing, and sending data. In this embodiment, server 102 hosts tree program 120, which augments tree data structures. In other embodiments, server 102 represents a server computing system utilizing multiple computers as a server system, such as in a cloud computing environment. In another embodiment, server 102 represents a laptop computer, a tablet computer, a netbook computer, a personal computer (PC), a desktop computer, a personal digital assistant (PDA), a smart phone, or any programmable electronic device capable of communicating with network 112. In another embodiment, server 102 represents a computing system utilizing clustered computers and components to act as a single pool of seamless resources. Server 102 may include components, as depicted and described in further detail with respect to FIG. 6, in accordance with embodiments of the present invention. Server 102 includes tree program 120 and database 140.

In depicted distributed data processing environment 100, tree program 120 resides on server 102 and augments tree data structures. In various embodiments, tree program 120 may be accessed by a client device (e.g., client device 104) or a plurality of client devices (not depicted) via network 112. In some embodiments, tree program 120 may reside on a client device and operate as an independent standalone program. In an embodiment, tree program 120 may receive files containing tree data structures to augment (e.g., from client devices). In another embodiment, tree program 120 may access a database (e.g., database 140) containing tree data structures, and augment the tree data structures contained in the database. In various embodiments, tree program 120 augments tree data structures based upon preset rules to enable easier readability for a user. Tree program 120 is depicted and described in further detail with respect to FIG. 2.

In the depicted embodiment, database 140 resides on server 102. In another embodiment, database 140 may reside elsewhere in distributed data processing environment 100, such as within one or more additional server(s) (not shown), within one or more additional client devices (e.g., client device 104), or independently as a standalone database that is capable of communicating with tree program 120 via network 112. A database is an organized collection of data. Database 140 is implemented with any type of storage device capable of storing data that is accessed and utilized by server 102, such as a database server, a hard disk drive, or a flash memory. In other embodiments, database 140 represents multiple storage devices within server 102. Database 140 stores information, such as data formats, rules based upon data formats, rules based upon file types, files to augment, etc. In an example, database 140 stores rules stored by a user of tree program 120 dictating preferences for displaying nodes related to phone numbers. Database 140 includes source file 142.

In the depicted embodiment, source file 142 resides in database 140. Source file 142 is a source of output (e.g., a mobile device) in a specific data format (e.g., JavaScript™ Object Notation (JSON)), which has been stored in database 140. In some embodiments, source file 142 may contain a data tree structure. In other embodiments, source file 142 may contain source code. In some embodiments, source file 142 is received directly by tree program 120 from a client device (e.g., client device 104).

In the depicted embodiment, client device 104 is one or more of a desktop computer, a laptop computer, a tablet computer, a specialized computer server, a smart phone, or any programmable electronic device capable of communicating with server 102 via network 112 and with various components and devices within distributed data processing environment 100. In general, client device 104 represents any programmable electronic device or combination of programmable electronic devices capable of executing machine readable program instructions and communicating with other computing devices via a network, such as network 112. Client device 104 may include components as depicted and described in further detail with respect to FIG. 6, in accordance with embodiments of the present invention.

Figure 2:
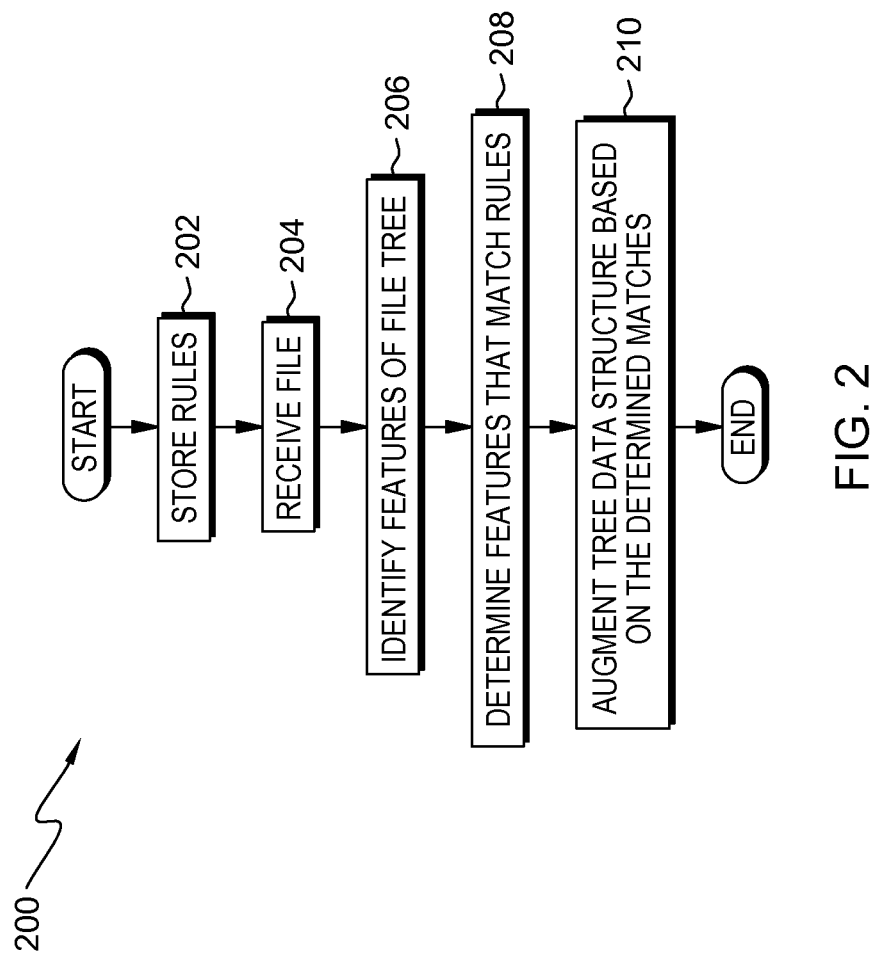
FIG. 2 is a flowchart depicting operational steps of a program for augmenting tree data structures within the distributed data processing environment of FIG. 1, in accordance with an embodiment of the present invention.

FIG. 2 is a flowchart depicting operational steps of program 200, which is a function of tree program 120, in accordance with an embodiment of the present invention. Program 200 operates on server 102 and augments tree data structures. In various embodiments, program 200 may create a tree data structure from a received or stored file created by a source output. In one embodiment, an administrator initiates the operational steps of program 200 to review tree data structures. In another embodiment, tree program 120 may initiate the operational steps of program 200 in response to receiving or storing a new file. In yet another embodiment, the operational steps of program 200 may initiate at preset time intervals.

Program 200 stores rules (step 202). In various embodiments, program 200 may store rules for user preferences of a tree data structure. Rules are also known as commands or rule sets. For example, a user may prefer to display a node in a tree data structure containing an address which is displayed in a specific color and therefore select a color from a list of preset colors to display addresses. In this example, features may be selected in a tree data structure for program 200 to enact a rule, such as displaying an address. In another example, a user may prefer a multitude of preset rules, such as displaying a node name, filtering nodes, expand expanding nodes, coloring nodes, etc., in the tree data structure. In this example, the user may select a specific node, such as phone number, address, age, etc., to enact the preset rules. In yet another example, a user may prefer a combination of preset rules based on the type of data source of the file, such as a mobile device, a laptop, etc. In some embodiments, program 200 includes a plurality of user accounts. Program 200 may store different rule sets for each of the plurality of user accounts, as well as multiple setting for rule sets within an account.

In various embodiments, program 200 may set rules based upon various features of a file. In an example of a tree data structure from a mobile device (e.g., client device 104), program 200 may set rules based upon the path of an element, the path length of an element, the root, nodes, child and parent nodes, regular expressions, and/or the difference between child node paths.

In some embodiments, program 200 stores preset rules, also referred to as schema, based upon the data source. In an embodiment, program 200 may create rules for a file based on data source of the file. In an example, a user or administrator of program 200 creates or selects rules for displaying a tree data structure for a file with an email data source. In this example, program 200 utilizes the same rule set for all similar data sources, such as email. In some embodiments, program 200 may store preset rules based upon the creator of the file and not the data source. For example, program 200 may have preset rules for the display of a tree data structure which may include all files received from a specific location, or a specific person, instead of the specific data source device.

Program 200 receives a file (step 204). In various embodiments, program 200 receives a file (e.g., source file 142) from a client device (e.g., client device 104). In an example, program 200 may receive a file containing the tree data structure depicted in FIG. 3 or FIG. 4. In other embodiments, program 200 may search a database to identify a file (e.g., source file 142). In some embodiments, program 200 may receive multiple files and store the files in a database, such as database 140. At a later time, program 200 may retrieve one of the stored files from the database. In one embodiment, program 200 receives a file that is already in a tree data structure format. In another embodiment, program 200 receives a file that is not in a tree data structure format. In these embodiments, program 200 may send the file to a program that creates a tree data structure that corresponds to the file and then sends the created tree data structure back to program 200. In some embodiments, program 200 identifies a file which is in a data tree structure based upon the format of the file. In other embodiments, a user may indicate that the file is a data tree structure. In yet other embodiments, program 200 may determine that a file is a data tree structure by identifying features within the file, such as objects, arrays, nodes, etc.

Program 200 identifies features of a tree data structure (step 206). In some embodiments, program 200 may receive a file that is already in the format of a file tree data structure. In these embodiments, program 200 may then determine the data format of the file tree data structure. Program 200 determines which of the multiple data formats the file tree data structure originates from and then identifies features of the file tree data structure for the determined specific data format. In an example, program 200 may receive files that are created in different data formats, and program 200 determines the type of data format, which enables program 200 to identify features in the tree data structure as different formats may have different structures. In some embodiments, program 200 identifies features of a file tree data structure without first determining the data format. In one example, program 200 only receives files in one type of data format, and therefore, only identifies features of tree data structures for the one data format. In some embodiments, program 200 receives a file that does not contain a file tree data structure, and program 200 identifies features which comprise a file tree data structure contained within the received file.

In various embodiments, program 200 identifies features in the received file, which may comprise a tree data structure. In an example, program 200 receives a file that is already in tree data format. Program 200 identifies the features of the tree data format based on one or more of: the path of an element, the path length of an element, the root, nodes, child and parent nodes, regular expressions, difference between child node paths, composition of child node paths specified using relative paths, object, array, object property, and primitive. In another example, program 200 may receive a file from a data source, such as client device 104, and send the file to a tree data format program to create an initial tree data structure. Program 200 may then receive the file in tree data form and identify features in the received file which comprise the tree data structure.

In some embodiments, program 200 identifies features of a tree data structure that include specific criteria. Specific criteria may include: does the node path match a regular expression; does a given child path map to a value of a given type; does a given child path map to a value that evaluates to a given value; does a given child path exist; does a given child path not map to a value of a given type; does a given child path not map to a value that evaluates to a given value; does a given child path not exist.

Program 200 determines features that match rules (step 208). In some embodiments, program 200 compares the identified features (from step 206) to features in the stored rules (from step 202) and determines if the features match that will initiate execution of the stored rules. In an example, program 200 identified a node with a path of "session[0] .messages[5].layout.controls[0].currState.text." Program 200 determines if any preset rules match the path for the identified node. In some embodiments, program 200 searches each identified feature (from step 206) in the file to determine if are any matches in the stored rules that exist. In other embodiments, program 200 may identify the rules for an account and search the received file for matches that initiate execution of the rules. In an embodiment, program 200 searches for matches of the identified features in step 206 and the rule features (from step 202) one at a time.

Program 200 augments the tree data structure based on the determined matches (step 210). In various embodiments, program 200 augments the tree data structure based upon the features that match the preset commands. In an example, program 200 determines that a match exists between a node path and a preset rule for such a node path. Program 200 augments the nodes based upon the matched rules. Examples of augmenting a tree data structure based upon matches between identified features and rules include: naming the node using a value of a child node specified with a relative path; naming the node with a static text value; giving the node a specified color; expanding the node; excluding the node; prefix a name value with some static text; adding static text after a name value; and when expanding a node, also expanding parent nodes up some number of levels. In various embodiments, after program 200 augments a tree data structure, program 200 may send the augmented tree data structure to a client device (e.g., client device 104). In another embodiment, program 200 may create a file containing the augmented tree data structure that can be stored in a database (e.g., database 140).

In some embodiments, program 200 may display the augmented tree data structure when program 200 completes step 210. In other embodiments, program 200 may store a tree data structure in a database (e.g., database 140) upon the completion of step 210. In yet other embodiments, program 200 may send a file containing an augmented data tree structure to a client device (e.g., client device 104).

In an example, FIG. 5 depicts augmentation to a tree data structure based upon determined matches. In this example, program 200 identified a match of the feature "address" in the received file as well as in the stored rules. In response to the determined match for "address", program 200 augments the node to display the street address, the city, the state, and the postal code without expanding the node.

FIG. 3 depicts an expanded tree data structure. FIG. 3 is a representation of a tree data structure that may be received by tree program 120. FIG. 3 displays varies nodes which have been expanded to display contents of the expanded nodes. In some examples, an expanded tree data structure may consume multiple pages of information and be difficult for a human to digest.

FIG. 4 depicts a collapsed tree data structure. FIG. 4 is a representation of a tree data structure that may be received by tree program 120. FIG. 4 depicts the tree data structure from FIG. 3 that has been fully collapsed. FIG. 4 displays varies nodes which have been collapsed. In some examples, a collapsed tree data structure may be beneficial to conserve space, but the collapsed tree data structure may not display information which is useful.

FIG. 5 depicts a collapsed tree data structure that has been augmented to display certain features while in a collapsed state. FIG. 5 depicts the tree data structures from FIGS. 3 and 4 that the tree program augmented. FIG. 5 displays information contained in nodes, which before augmentation are only displayed after a node has been expanded. Examples of information contained in nodes which have been displayed while the tree data structure is still collapsed in FIG. 5 include: address 21 2nd Street New York N.Y. 10021, home 212 555-1234, fax 646 555-4567, gender male.

Figure 6:
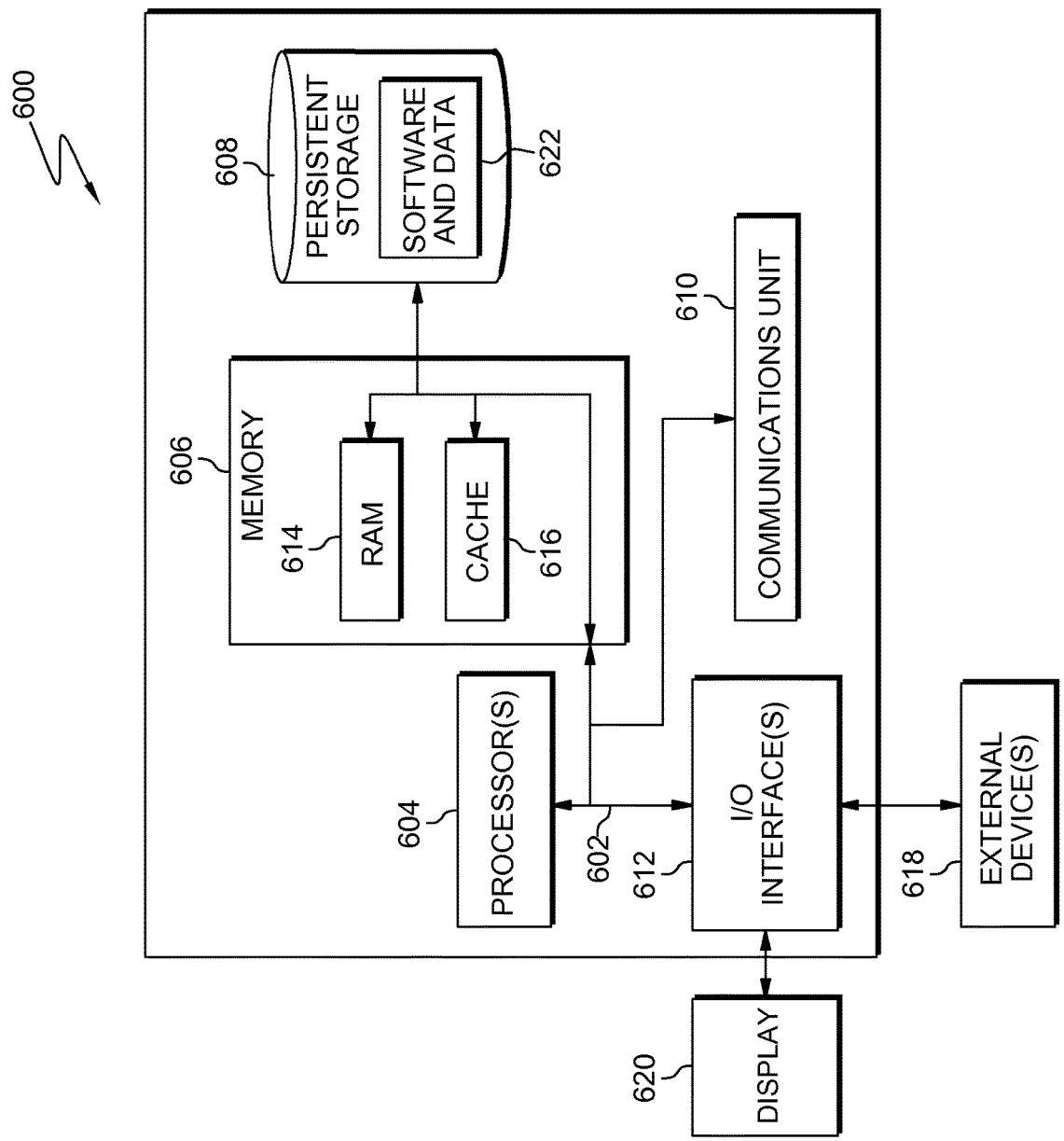
FIG. 6 depicts a block diagram of components of a server and a client device of FIG. 1, in accordance with an embodiment of the present invention.

FIG. 6 depicts a block diagram of components of computer 600, which is representative of server 102 and client device 104, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications, and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media. Software and data 622 are stored in persistent storage 608 for access and/or execution by processor(s) 604 via one or more memories of memory 606. With respect to server 102, software and data 622 represents tree program 120 and database 140.

In this embodiment, persistent storage 608 includes a magnetic hard disk drive. Alternatively, or in addition to a magnetic hard disk drive, persistent storage 608 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Software and data 622 may be downloaded to persistent storage 608 through communications unit 610.

I/O interface(s) 612 allows for input and output of data with other devices that may be connected to computer 600. For example, I/O interface(s) 612 may provide a connection to external device(s) 618, such as a keyboard, a keypad, a touch screen, and/or some other suitable input device. External device(s) 618 can also include portable computer readable storage media, such as, for example, thumb drives, portable optical or magnetic disks, and memory cards. Software and data 622 can be stored on such portable computer readable storage media and can be loaded onto persistent storage 608 via I/O interface(s) 612. I/O interface(s) 612 also connect to a display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for augmenting data tree structures, the method comprising:
   identifying, by one or more computer processors, a tree data structure;
   identifying, by one or more computer processors, one or more features in the identified tree data structure, wherein the one or more features comprise a node of the tree data structure, an object of the tree data structure, an array of the tree data structure, an object property of the tree data structure, the path of an element, the path length of an element, and a root of the tree data structure;
   determining, by one or more computer processors, whether one of the one or more identified features matches a feature that initiates execution of a user created rule, wherein the user created rule is based at least in part on a type of a data source of a file containing the tree data structure, wherein the type of the data source corresponds to an application type associated with the data source, wherein the user created rule defines augmentations to the tree data structure based upon one or more features in the tree data structure, wherein the feature that initiates execution of the user created rule comprises one of:
      determining, by one or more computer processors, that a child node path maps to a preset value;
      determining, by one or more computer processors, that a child node path maps to a value that evaluates to a preset value; and
      determining, by one or more computer processors, that a child node path exists;
   in response to determining that one or more identified features match the feature that initiates execution of the user created rule, augmenting, by one or more computer processors, the identified tree data structure based upon the determined one or more matches of the one or more identified features and the feature that initiates execution of the user created rule, wherein augmenting the identified tree data structure includes:
      modifying a name of a root node of the identified tree data structure based at least in part on a value of one or more child nodes, wherein the value corresponds to information contained in the one or more child nodes; and
   displaying, by one or more computer processors, the information contained in the one or more child nodes of the augmented identified tree data structure while the tree data structure is in a collapsed state, wherein the information contained in the one or more child nodes prior to augmenting is only displayed after the one or more child nodes are expanded.

2. The method of claim 1, wherein augmenting the identified data tree structure further comprises:
   identifying, by one or more computer processors, a first feature of the one or more identified features determined to match the feature that initiates execution of the rule; and
   augmenting, by one or more computer processors, the identified first feature of the one or more identified features, wherein augmenting comprises naming a node of the tree data structure, coloring a node of the tree data structure, expanding a node of the tree data structure, and excluding a node from a tree data structure, wherein naming the node of the tree data structure includes:

appending, by one or more computer processors, one or more values of at least one child node of the node to a name of the node in the tree data structure, wherein the appended one or more values are associated with the one or more identified features.

3. The method of claim 1, wherein augmenting the identified data tree structure further comprises one of:

augmenting, by one or more computer processors, the tree data structure to add static text before a name in the tree data structure;

augmenting, by one or more computer processors, the tree data structure to add static text after a name in the tree data structure; and augmenting, by one or more computer processors, the tree data structure to add static text both before and after a name in the tree data structure.

4. The method of claim 1, wherein augmenting the identified data tree structure further comprises:

augmenting, by one or more computer processors, the tree data structure to expand a parent node of the node in the tree data structure based on a feature of the node.

5. The method of claim 1, wherein determining whether one of the one or more identified features matches a feature that initiates execution of a rule further comprises:

identifying, by one or more computer processors, a child node in the tree data structure; and determining, by one or more computer processors, if one or more features of the child node of the tree data structure match a feature that initiates execution of a rule, wherein features of the child node comprise at least one of: a type of the child node, a value of the child node, and an existence of the child node.

6. The method of claim 1, wherein identifying one or more features of the identified tree data structure comprises:

identifying, by one or more computer processors, a path of a node in the tree data structure that matches a regular expression.

7. The method of claim 1, further comprising:

identifying, by one or more computer processors, the type of the data source of the file containing the tree data structure; and creating, by one or more computer processors, the user created rule utilizing two or more preset rules based at least in part on the type of the data source of the file containing the tree data structure, wherein the type corresponds to a data source device.

8. The method of claim 1, further comprising:

in response to receiving the file containing the tree data structure, determining, by one or more processors, a location of the file containing the tree data structure; and selecting, by one or more processors, one or more rule sets based at least in part on the location of the file containing the tree data structure.

9. A computer program product for augmenting data tree structures, the computer program product comprising:

one or more computer readable storage media and program instructions stored on the one or more computer readable storage media, the program instructions comprising: program instructions to identify a tree data structure;

program instructions to identify one or more features in the identified tree data structure, wherein the one or more features comprise a node of the tree data structure, an object of the tree data structure, an array of the tree data structure, an object property of the tree data structure, the path of an element, the path length of an element, and a root of the tree data structure;

program instructions to determine whether one of the one or more identified features matches a feature that initiates execution of a user created rule, wherein the user created rule is based at least in part on a type of a data source of a file containing the tree data structure, wherein the type of the data source corresponds to an application type associated with the data source, wherein the user created rule defines augmentations to the tree data structure based upon one or more features in the tree data structure, wherein the feature that initiates execution of the user created rule comprises one of:

program instructions to determine that a child node path maps to a preset value;

program instructions to determine that a child node path maps to a value that evaluates to a preset value; and program instructions to determine that a child node path exists;

in response to program instructions to determine that one or more identified features match the feature that initiates execution of the user created rule, program instructions to augment the identified tree data structure based upon the determined one or more matches of the one or more identified features and the feature that initiates execution of the user created rule, wherein augmenting the identified tree data structure includes:

program instructions to modify a name of the root of the identified tree data structure based at least in part on a value of one or more child nodes, wherein the value corresponds to information contained in the one or more child nodes; and program instructions to display the information contained in the one or more child nodes of the augmented identified tree data structure while the tree data structure is in a collapsed state, wherein the information contained in the one or more child nodes prior to augmenting is only displayed after the one or more child nodes are expanded.

10. The computer program product of claim 9, wherein augmenting the identified data tree structure further comprises program instructions to:

identify a first feature of the one or more identified features determined to match the feature that initiates execution of the rule; and augment the identified first feature of the one or more identified features, wherein augmenting comprises naming a node of the tree data structure, coloring a node of the tree data structure, expanding a node of the tree data structure, and excluding a node from a tree data structure, wherein naming the node of the tree data structure includes program instructions to:

append one or more values of at least one child node of the node to a name of the node in the tree data structure, wherein the appended one or more values are associated with the one or more identified features.

11. The computer program product of claim 9, wherein augmenting the identified data tree structure further comprises one of:

program instructions to augment the tree data structure to add static text before a name in the tree data structure;

program instructions to augment the tree data structure to add static text after a name in the tree data structure; and program instructions to augment the tree data structure to add static text both before and after a name in the tree data structure.

12. The computer program product of claim 9, wherein augmenting the identified data tree structure further comprises program instructions to:

augment the tree data structure to expand a parent node of the node in the tree data structure based on a feature of the node.

13. The computer program product of claim 9, wherein determining whether one of the one or more identified features matches a feature that initiates execution of a rule further comprises program instructions to:

identify a child node in the tree data structure; and determine if one or more features of the child node of the tree data structure match a feature that initiates execution a rule, wherein features of the child node comprise at least one of: a type of the child node, a value of the child node, and an existence of the child node.

14. The computer program product of claim 9, wherein identifying one or more features of the identified tree data structure comprises program instructions to:

identify a path of a node in the tree data structure that matches a regular expression.

15. A computer system for augmenting data tree structures, the computer system comprising:

one or more computer processors;

one or more computer readable storage media;

program instructions stored on the computer readable storage media for execution by at least one of the one or more computer processors, the program instructions comprising:

program instructions to identify a tree data structure;

program instructions to identify one or more features in the identified tree data structure, wherein the one or more features comprise a node of the tree data structure, an object of the tree data structure, an array of the tree data structure, an object property of the tree data structure, the path of an element, the path length of an element, and a root of the tree data structure;

program instructions to determine whether one of the one or more identified features matches a feature that initiates execution of a user created rule, wherein the user created rule is based at least in part on a type of a data source of a file containing the tree data structure, wherein the type of the data source corresponds to an application type associated with the data source, wherein the user created rule defines augmentations to the tree data structure based upon one or more features in the tree data structure, wherein the feature that initiates execution of the user created rule comprises one of:

program instructions to determine that a child node path maps to a preset value;

program instructions to determine that a child node path maps to a value that evaluates to a preset value; and program instructions to determine that a child node path exists;

in response to program instructions to determine that one or more identified features match the feature that initiates execution of the user created rule, program instructions to augment the identified tree data structure based upon the determined one or more matches of the one or more identified features and the feature that initiates execution of the user created rule, wherein augmenting the identified tree data structure includes:

program instructions to modify a name of the root of the identified tree data structure based at least in part on a value of one or more child nodes, wherein the value corresponds to information contained in the one or more child nodes; and program instructions to display the information contained in the one or more child nodes of the augmented identified tree data structure while the tree data structure is in a collapsed state, wherein the information contained in the one or more child nodes prior to augmenting is only displayed after the one or more child nodes are expanded.

16. The computer system of claim 15, wherein augmenting the identified data tree structure further comprises program instructions to:

identify a first feature of the one or more identified features determined to match the feature that initiates execution of the rule; and augment the identified first feature of the one or more identified features, wherein augmenting comprises naming a node of the tree data structure, coloring a node of the tree data structure, expanding a node of the tree data structure, and excluding a node from a tree data structure, wherein naming the node of the tree data structure includes program instructions to:

append one or more values of at least one child node of the node to a name of the node in the tree data structure, wherein the appended one or more values are associated with the one or more identified features.

17. The computer system of claim 15, wherein augmenting the identified data tree structure further comprises one of:

program instructions to augment the tree data structure to add static text before a name in the tree data structure;

program instructions to augment the tree data structure to add static text after a name in the tree data structure; and program instructions to augment the tree data structure to add static text both before and after a name in the tree data structure.

18. The computer system of claim 15, wherein augmenting the identified data tree structure further comprises program instructions to:

augment the tree data structure to expand a parent node of the node in the tree data structure based on a feature of the node.

19. The computer system of claim 15, wherein determining whether one of the one or more identified features matches a feature that initiates execution of a rule further comprises program instructions to:

identify a child node in the tree data structure; and determine if one or more features of the child node of the tree data structure match a feature that initiates execution of a rule, wherein features of the child node comprise at least one of: a type of the child node, a value of the child node, and an existence of the child node.

\* \* \* \* \*